United States Patent
Kishima

(10) Patent No.: US 10,377,431 B2
(45) Date of Patent: Aug. 13, 2019

(54) VEHICLE SIDE STRUCTURE OF PICKUP TRUCK

(71) Applicant: TOYOTA JIDOSHA KABUSHIKI KAISHA, Toyota-shi (JP)

(72) Inventor: Fumihiko Kishima, Konan (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 50 days.

(21) Appl. No.: 15/846,552

(22) Filed: Dec. 19, 2017

(65) Prior Publication Data

US 2018/0178860 A1 Jun. 28, 2018

(30) Foreign Application Priority Data

Dec. 27, 2016 (JP) ................................. 2016-253647

(51) Int. Cl.
*B60J 5/00* (2006.01)
*B62D 35/00* (2006.01)
*B62D 33/023* (2006.01)

(52) U.S. Cl.
CPC ......... *B62D 35/008* (2013.01); *B62D 33/023* (2013.01); *Y02T 10/82* (2013.01)

(58) Field of Classification Search
CPC .. B62D 55/08; B62D 1/28; E02F 3/64; B60G 11/22; B60K 17/10; B60N 2/36; B60P 3/08; G07B 15/063; G01S 13/931; G01C 21/28
USPC ............................................ 296/186.1, 181.5
See application file for complete search history.

(56) References Cited

U.S. PATENT DOCUMENTS

| | | | | |
|---|---|---|---|---|
| 4,475,759 A * | 10/1984 | Wine | ................... | B62D 35/007 296/180.5 |
| 6,042,173 A * | 3/2000 | Nett | ...................... | B60J 7/1621 296/100.06 |
| 6,179,361 B1 * | 1/2001 | Sailors | ...................... | B60P 1/26 296/180.1 |
| 6,183,041 B1 * | 2/2001 | Wilson | ...................... | B60J 1/20 296/180.1 |
| 8,210,600 B1 * | 7/2012 | Verhee | ................. | B62D 35/005 296/180.1 |
| 2003/0127873 A1 * | 7/2003 | Reed | ................... | B62D 33/0273 296/26.08 |
| 2008/0315623 A1 * | 12/2008 | Khalighi | ............ | B62D 33/0273 296/180.5 |

(Continued)

FOREIGN PATENT DOCUMENTS

JP 2013-244814 12/2013

*Primary Examiner* — Kiran B Patel
(74) *Attorney, Agent, or Firm* — Oblon, McClelland, Maier & Neustadt, L.L.P.

(57) ABSTRACT

A vehicle side structure of a pickup truck includes a cabin; and a loading platform that is disposed adjacent to a rear side of the cabin in the vehicle forward-rearward direction, is configured to include a bottom plate, a pair of right and left side panels, and a tail gate, and is formed in a box shape that opens toward a vehicle upper side. Each of the right and left side panels includes a traveling wind inlet part that is disposed at an outer part of each of the right and left side panels in a vehicle width direction, opens toward a vehicle front side, and includes a first opening, a traveling wind blowing part that is disposed at an upper end part of each of the right and left side panels, opens toward the vehicle upper side, and includes a second opening, and an intermediate part.

7 Claims, 7 Drawing Sheets

(56) References Cited

U.S. PATENT DOCUMENTS

| | | |
|---|---|---|
| 2015/0158439 A1 | 6/2015 | Zha |
| 2015/0246696 A1 | 9/2015 | Froling et al. |
| 2015/0329151 A1* | 11/2015 | Kishima ................ B62D 35/02 296/180.1 |
| 2016/0039479 A1* | 2/2016 | Kishima ................ B62D 25/08 296/181.5 |
| 2017/0101138 A1* | 4/2017 | Povinelli ................. B60J 7/141 |
| 2017/0355333 A1* | 12/2017 | Kishima ................ B60R 19/48 |

* cited by examiner

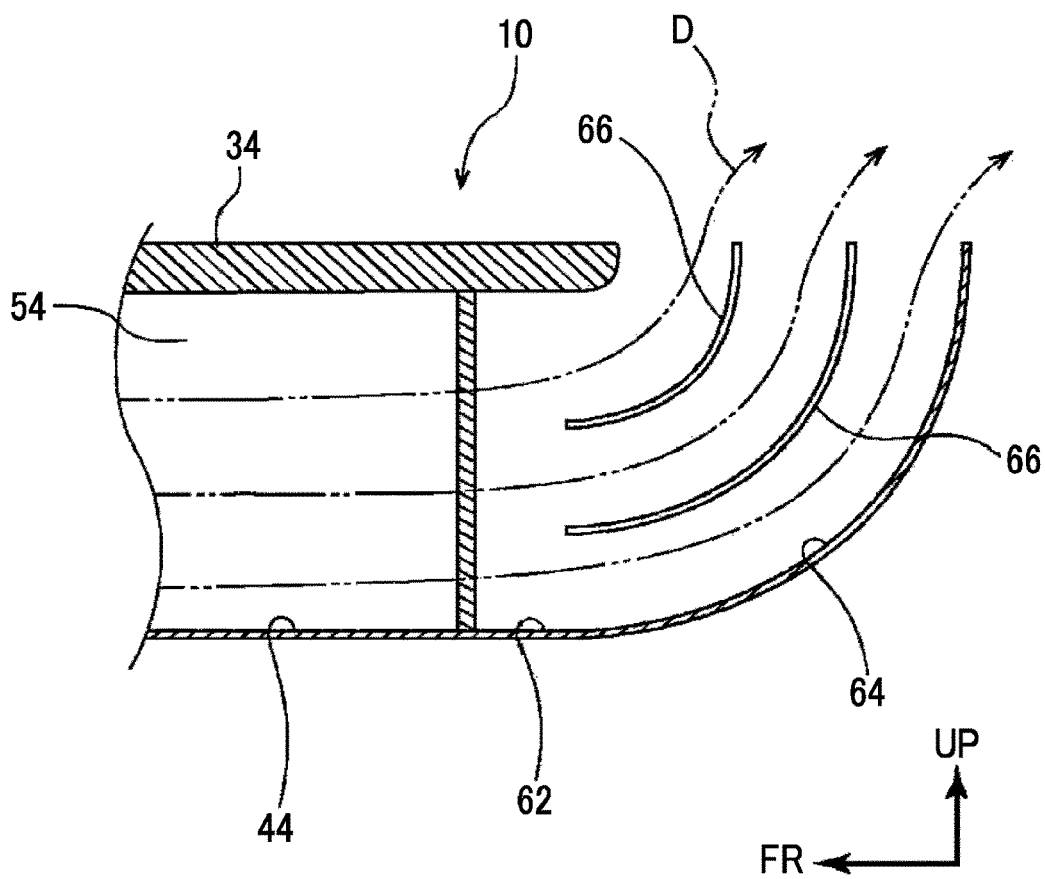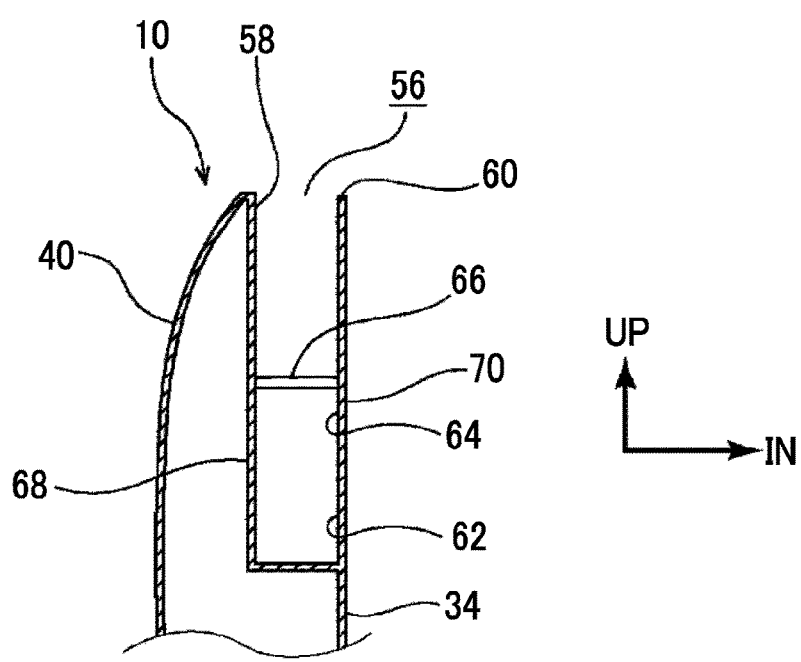

VEHICLE SIDE STRUCTURE OF PICKUP TRUCK

INCORPORATION BY REFERENCE

The disclosure of Japanese Patent Application No. 2016-253647 filed on Dec. 27, 2016 including the specification, drawings and abstract is incorporated herein by reference in its entirety.

BACKGROUND

1. Technical Field

The present disclosure relates to a vehicle side structure of a pickup truck.

2. Description of Related Art

During the traveling of a vehicle in which a cabin and a loading platform are coupled together like a pickup truck, traveling wind, which has passed through rear end parts of a cabin on both sides in a vehicle width direction, runs around at a relatively high flow speed inward in the vehicle width direction on a vehicle upper side of a loading platform, and flows toward a vehicle rear side so as to hit a tail gate. Since the traveling wind that flows in this way collides against an upper side of the tail gate in a vehicle upward-downward direction, the pressure on the vehicle front side of the tail gate becomes relatively high. Accordingly, it is known that the air resistance received by the vehicle increases. For this reason, in the related art, a technique of deflecting the flow of the traveling wind on the vehicle upper side of the loading platform, thereby controlling a flow rate on a rear side of the loading platform and improving the aerodynamic performance of a vehicle is known.

For example, a loading-platform structure of a pickup truck provided with a tonneau cover for covering at least a rear side on the upper side of the loading platform in the vehicle upward-downward direction is disclosed in United States Patent Laid-Open No. 2015/0246696. According to the structure, entering of the traveling wind, which has passed through the rear end parts of the cabin on both sides in the vehicle width direction, into the loading platform, is suppressed, and the collision of the traveling wind against an upper side of the tail gate is suppressed. As a result, since the pressure acting on a vehicle front side of the tail gate is relatively reduced and the air resistance of the overall vehicle decreases relatively, aerodynamic performance is relatively improved.

SUMMARY

However, in the case of the vehicle side structure of a pickup truck disclosed in United States Patent Laid-Open No. 2015/0246696, due to the tonneau cover and a link mechanism for attaching the tonneau cover to the loading platform, the number of parts increases and the weight of vehicle increases. For this reason, even when the air resistance is relatively reduced by controlling the flow rate, fuel efficiency decreases relatively with an increase in the weight of the vehicle. Therefore, there is also a disadvantageous case where the effect of relatively reducing the air resistance is offset. Moreover, since it is necessary to provide a space that stores the tonneau cover, a space for front and rear end parts of the loading platform in a vehicle forward-rearward direction is relatively reduced. Moreover, since the tonneau cover is provided, there is also a disadvantageous case where restrictions are imposed on the height of freights to be loaded on the loading platform.

The present disclosure provides a vehicle side structure of a pickup truck that can further reduce the air resistance received by a vehicle and can suppress an increase in the weight of the vehicle.

An aspect of the present disclosure relates to a vehicle side structure of a pickup truck including a cabin that is disposed at a middle of a vehicle body in a vehicle forward-rearward direction; and a loading platform that is disposed adjacent to a rear side of the cabin in the vehicle forward-rearward direction, is configured to include a bottom plate formed in a rectangular flat plate shape, a pair of right and left side panels, the side panels being erected toward a vehicle upper side from both sides of the bottom plate in a vehicle width direction and extending in the vehicle forward-rearward direction, and a tail gate that is erected toward the vehicle upper side from a rear end part of the bottom plate and extends in the vehicle width direction, and the loading platform is formed in a box shape that opens toward the vehicle upper side (in addition, in the present specification, the expression "the intermediate part" includes meaning "a substantially intermediate part"). Each of the right and left side panels includes a traveling wind inlet part that is disposed at an outer part of each of the right and left side panels in the vehicle width direction, and includes a first opening which opens toward a vehicle front side, and into which traveling wind flowing along an outer surface of each of the right and left side panels in the vehicle width direction flows, a traveling wind blowing part that is disposed at an upper end part of each of the right and left side panels, and includes a second opening which opens toward the vehicle upper side, and which from which the traveling wind flowing in from the traveling wind inlet part flows out, and an intermediate part including a flow passage provided between the traveling wind inlet part and the traveling wind blowing part.

The working of the vehicle side structure of a pickup truck of the aspect of the present disclosure is as follows. In the pickup truck in which the cabin and the loading platform are coupled together, the traveling wind that flows along the outer surface of each side panel in the vehicle width direction during traveling of the vehicle flows in from the first opening of the traveling wind inlet part disposed at the outer part of the side panel. An airstream that has flowed into the traveling wind inlet part is straightened by passing through the intermediate part. The straightened airstream flows out at a relatively high flow speed from the second opening of the traveling wind blowing part to the vehicle upper side. Meanwhile, the traveling wind, which has passed through rear end parts of the cabin on both sides in the vehicle width direction, runs around at a relatively high flow speed inward in the vehicle width direction on the vehicle upper side of the loading platform, and flows toward the vehicle rear side of the loading platform where the tail gate is erected and toward the inside in the vehicle width direction. The traveling wind collides against the airstream that has flowed out at a relatively high flow speed from the traveling wind blowing part on the vehicle upper side of the traveling wind blowing part. For this reason, the traveling wind, which tries to run around to the inside in the vehicle width direction due to an inertia force of the airstream that has flowed out at a relatively high flow speed from the traveling wind blowing part, is deflected.

In this way, according to the aspect of the present disclosure, the traveling wind, which passes through the rear end parts of the cabin on both sides in the vehicle width direction and tries to run around to the inside of the loading platform in the vehicle width direction, is pushed out outward in the vehicle width direction. Therefore, the flow rate of the traveling wind that collides against the tail gate erected from the rear end part of the loading platform is further reduced. Accordingly, since the wind pressure received by the tail gate is further reduced and the air resistance of the overall vehicle is further reduced, aerodynamic performance is improved.

Additionally, according to the aspect of the present disclosure, it is not needed to attach a heavy load, such as a tonneau cover, and a structure or mechanism for actuating the heavy load is also not needed. For this reason, compared to a tonneau cover mounted vehicle, the number of parts is reduced, and the weight of the vehicle is also reduced. Moreover, since it is not needed to attach the tonneau cover, there is no restriction on the height of freights to be loaded on the loading platform.

As described above, the vehicle side structure of a pickup truck of the aspect of the present disclosure has excellent effects that the air resistance received by a vehicle can be further reduced and an increase in the weight of the vehicle can be suppressed.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a sectional view, taken along line IV-IV, illustrating the vehicle side structure of a pickup truck illustrated in FIG. 3;

FIG. 5 is a sectional view, taken along line V-V, illustrating the vehicle side structure of a pickup truck illustrated in FIG. 2;

DETAILED DESCRIPTION OF EMBODIMENTS

Hereinafter, a first embodiment of a vehicle side structure of a pickup truck will be described with reference to FIGS. 1 to 5. In addition, as appropriately illustrated in the following drawings, arrow FR indicates a vehicle front, arrow UP indicates a vehicle upper side, and arrow IN indicates an inside in the vehicle width direction.

Overall Configuration of Pickup Truck

Figure 1:
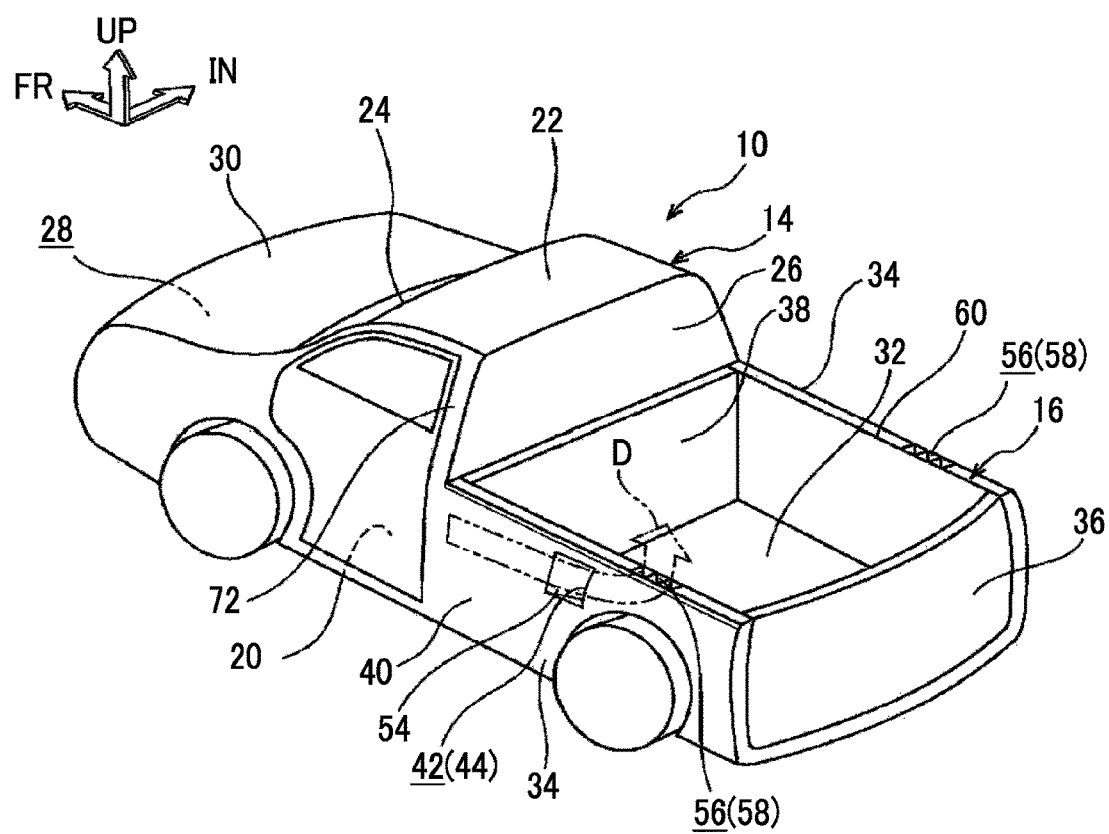
FIG. 1 is a schematic perspective view of a pickup truck having a vehicle side structure of a pickup truck according to a first embodiment as seen from a vehicle rear side.

First, an overall configuration of a pickup truck 10 will be described with reference to FIG. 1. As illustrated in FIG. 1, the pickup truck 10 is configured to include a cabin 14 disposed at an intermediate part in a vehicle forward-rearward direction, and a loading platform 16 disposed adjacent to a vehicle rear side of the cabin 14. The cabin 14 and the loading platform 16 are supported by a frame (not illustrated) that is provided with a pair of side members extending in the vehicle forward-rearward direction and a plurality of cross members bridging between the side members, and that is formed in the shape of a ladder in a vehicle plan view.

The configuration of the cabin 14 and the loading platform 16 will be briefly described. A floor panel 20 is disposed on a lower side of the cabin 14 in a vehicle upward-downward direction. Additionally, a roof panel 22 is disposed on the vehicle upper side of the cabin 14. A windshield glass 24 is disposed on a vehicle front side of the cabin 14, and a back panel 26 is disposed on the vehicle rear side of the cabin 14.

Additionally, an engine compartment 28 is disposed on the vehicle front side of the pickup truck 10. An engine hood 30 is disposed on an upper side of the engine compartment 28 in the vehicle upward-downward direction. A lower end part of the windshield glass 24 is disposed on a rear end side of the engine hood 30.

The loading platform 16 is formed in a box shape opening to the vehicle upper side. Specifically, the loading platform 16 is provided with a bottom plate 32 formed in a rectangular flat plate shape. Moreover, the loading platform 16 is configured to include a pair of right and left side panels 34, the side panels 34 being erected from both sides of the bottom plate 32 in the vehicle width direction toward the vehicle upper side and extending in the vehicle forward-rearward direction, a tail gate 36 erected from a rear end part of the bottom plate 32 toward the vehicle upper side, and a front upright plate 38 erected from a front end part of the bottom plate 32 toward the vehicle upper side.

Detailed Configuration of Vehicle Side Structure of Pickup Truck

Figure 2:
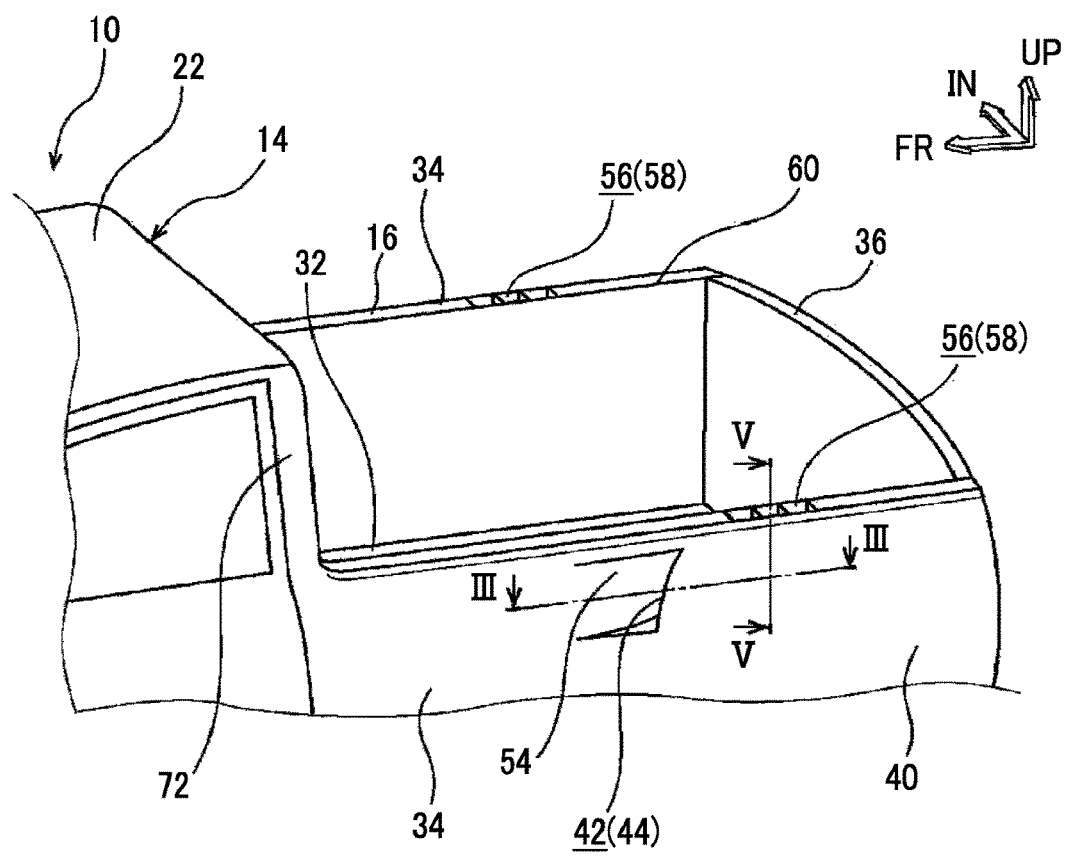
FIG. 2 is a schematic perspective view of a side panel of the pickup truck having the vehicle side structure of a pickup truck according to the first embodiment as seen from a vehicle lateral side.

As illustrated in FIGS. 1 and 2, substantially rectangular traveling wind inlet part 44 having the vehicle upward-downward direction as a longitudinal direction in a side view is disposed at an intermediate part of a vehicle-width-direction outer part 40 of each side panel 34 in the vehicle forward-rearward direction. A first opening 42 that opens toward the vehicle front side is provided at a front end part of the traveling wind inlet part 44, and is configured such that the traveling wind flowing along an outer surface of the side panel 34 in the vehicle width direction from the first opening 42 flows thereinto.

Figure 3:
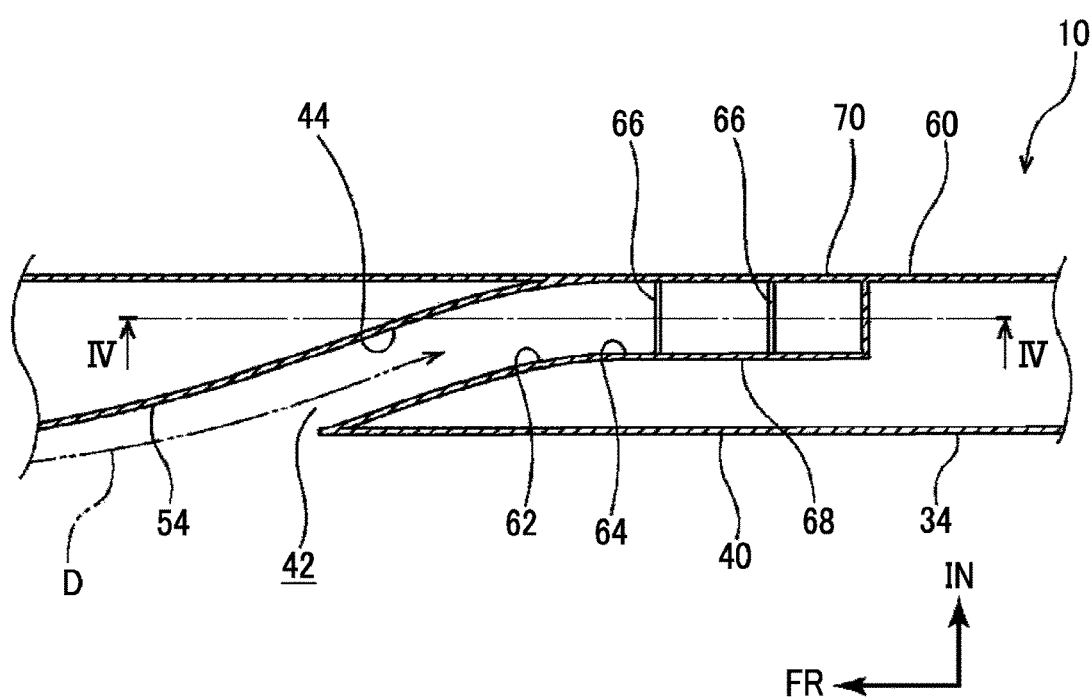
FIG. 3 is a sectional view, taken along line III-III, illustrating the vehicle side structure of a pickup truck illustrated in FIG. 2.

As illustrated in FIG. 3, a streamline-shaped introduction part 54 for taking traveling wind into the traveling wind inlet part 44 is integrally formed on the vehicle front side (upstream side) of the first opening 42. The height of the introduction part 54 (that is, the length thereof in the vehicle upward-downward direction) is set to be equal to the height of the first opening 42 and the traveling wind inlet part 44.

Additionally, the introduction part 54 is inclined inward in the vehicle width direction in a streamline shape, and is formed so as to connect to the first opening 42 and the traveling wind inlet part 44 in a streamline shape in order to efficiently take in the traveling wind around the traveling wind inlet part 44 without disturbing the flow of the traveling wind.

As illustrated in FIG. 5 and the like, a traveling wind blowing part 58 formed in a substantially rectangular shape in the vehicle plan view is disposed on a rear side of an upper end part of each side panel 34 in the vehicle forward-rearward direction. A second opening 56 that opens toward the vehicle upper side is formed at an upper end part of the traveling wind blowing part 58, and the traveling wind that has flowed in from the traveling wind inlet part 44 flows out of the second opening 56.

The length of the traveling wind blowing part 58 in the longitudinal direction is set to be equal to the length of the second opening 56 in the vehicle forward-rearward direction in order to make the traveling wind taken in from the traveling wind inlet part 44 efficiently flow out of the traveling wind blowing part 58 as an airstream D. Similarly, the length of the traveling wind blowing part 58 in a lateral direction is set to be equal to the length of the second opening 56 in the vehicle width direction.

An inside of the traveling wind blowing part 58 in the vehicle width direction is formed along a ridgeline 60 extending in the vehicle forward-rearward direction on an inside of the upper end part of each side panel 34 in the vehicle width direction in the vehicle plan view.

As illustrated in FIGS. 3 and 4, an intermediate part 64 provided with a flow passage 62 for straightening the traveling wind that has flowed in from the traveling wind inlet part 44 is provided between the traveling wind inlet part 44 and the traveling wind blowing part 58. The flow passage 62 extends in a streamline shape toward the vehicle rear side and the vehicle upper side in a vehicle side view between the intermediate part 64 and the traveling wind blowing part 58. Additionally, the flow passage 62 extends in a streamline shape toward the vehicle rear side and the inside in the vehicle width direction in the vehicle plan view between the intermediate part 64 and the traveling wind blowing part 58. The vicinity of the traveling wind blowing part 58 is formed along the ridgeline 60 extending in the vehicle forward-rearward direction on the inside of the upper end part of each side panel 34 in the vehicle width direction in the vehicle plan view. Here, the straightening means the flow of the air that flows at a uniform speed in one direction along a parallel streamline inside the intermediate part 64.

In order to remove and straighten the turbulence of the traveling wind taken in from the first opening 42 of the traveling wind inlet part 44, a straightening plate 66 extending so as to become parallel to the flow passage 62 between the intermediate part 64 and the traveling wind blowing parts 58 is provided inside the flow passage 62. The straightening plate 66 is a plate-shaped member made of any one of metal, resin, and a composite material or a combination thereof. There is provided a plurality of the straightening plates 66 (two in the present embodiment), and the straightening plates 66 are disposed at approximately equal intervals in the longitudinal direction of the flow passage 62, and extend between an outer wall 68 on an outside in the vehicle width direction and an inner wall 70 on the inside in the vehicle width direction.

Working and Effects of First Embodiment

Next, the working and the effects of the present embodiment will be described.

As for the vehicle side structure of a pickup truck of the present embodiment, in the pickup truck 10 in which the cabin 14 and the loading platform 16 are coupled together, the traveling wind that flows along the outer surface of each side panel 34 in the vehicle width direction during traveling flows into the first opening 42 of the traveling wind inlet part 44. The airstream that has flowed into the traveling wind inlet part 44 is straightened by passing through the intermediate part 64 provided with the straightening plates 66. The straightened airstream flows out as the airstream D having a relatively high flow speed from the second opening 56 of the traveling wind blowing part 58 along the straightening plates 66 to the vehicle upper side.

Meanwhile, the traveling wind, which has passed through rear end parts 72 of the cabin 14 on both sides in the vehicle width direction, runs around at a relatively high flow speed inward in the vehicle width direction on the vehicle upper side of the loading platform 16, and flows toward the vehicle rear side where the tail gate 36 is erected and toward the inside in the vehicle width direction. The traveling wind collides against the airstream D that has flowed out at a relatively high flow speed from the traveling wind blowing part 58 to the vehicle upper side on the vehicle upper side of the traveling wind blowing part 58. For this reason, the traveling wind, which tries to run around to the inside in the vehicle width direction on the vehicle upper side of the loading platform 16 due to an inertia force of the airstream D that has flowed out at a relatively high flow speed from the traveling wind blowing part 58 to the vehicle upper side, is pushed out and deflected outward in the vehicle width direction.

In this way, in the present embodiment, the traveling wind, which passes through the rear end parts 72 of the cabin 14 on both sides in the vehicle width direction and tries to run around to the inside of the loading platform 16 in the vehicle width direction, is pushed out and deflected outward in the vehicle width direction due to the airstream D that has flowed out at a relatively high flow speed from the traveling wind blowing part 58 to the vehicle upper side. For this reason, the flow rate of the traveling wind that collides against the tail gate 36 erected from a rear end part of the loading platform 16 is further reduced.

Additionally, in the present embodiment, an inner part of the second opening 56 in the vehicle width direction and the inside of the traveling wind blowing part 58 in the vehicle width direction are formed along the ridgeline 60 extending in the vehicle forward-rearward direction on the inside of the upper end part of each side panel 34 in the vehicle width direction in the vehicle plan view. For this reason, the traveling wind, which flows from the rear end parts 72 of the cabin 14 on both sides in the vehicle width direction, efficiently collides against the airstream D that flows out at a relatively high flow speed from the second opening 56 of the traveling wind blowing part 58 to the vehicle upper side. Accordingly, since the traveling wind is pushed out outward in the vehicle width direction, the flow rate of the traveling wind that runs around to the inside in the vehicle width direction on the vehicle upper side of the loading platform 16 and collides against the tail gate 36 is further reduced, and the wind pressure that the vehicle front side of the tail gate 36 receives is further reduced. As a result, the air resistance of the overall vehicle is further reduced, and aerodynamic performance is improved.

Moreover, in the present embodiment, it is not needed to attach a heavy load, such as a tonneau cover, in order to prevent the traveling wind from running around to the inside in the vehicle width direction on the vehicle upper side of the loading platform 16 and colliding against the tail gate 36, and a structure or mechanism for actuating the heavy load is also not needed. For this reason, compared to a tonneau cover mounted vehicle, the number of parts is reduced, and the weight of the vehicle is also reduced. Moreover, since it is not needed to attach the tonneau cover, there is no restriction on the height of freights to be loaded on the loading platform 16.

From the above description, in the vehicle side structure of a pickup truck according to the present embodiment, by controlling a flow rate on the rear side of the pickup truck 10 in the vehicle forward-rearward direction using the vehicle-width-direction outer part 40 of each side panel 34 of the pickup truck 10, the air resistance that the pickup truck 10 receives can be further reduced, and an increase in the weight of the vehicle can be suppressed.

Second Embodiment

Figure 6:
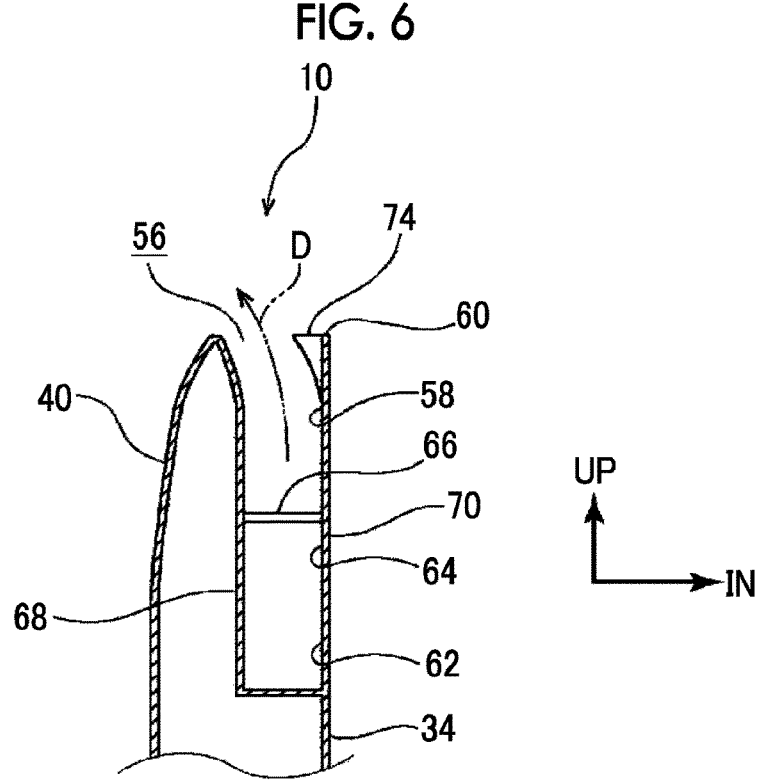
FIG. 6 is a sectional view corresponding to FIG. 5 illustrating a vehicle side structure of a pickup truck according to a second embodiment.

Next, a second embodiment of the vehicle side structure of a pickup truck will be described with reference to FIG. 6. In addition, the same components as those of the aforementioned first embodiment will be designated by the same numbers, and the description thereof will be omitted.

Similar to the vehicle side structure of a pickup truck described in the first embodiment, the vehicle side structure of a pickup truck according to the second embodiment is configured to include the cabin 14, the loading platform 16 having the side panels 34 and the tail gate 36, the traveling wind inlet part 44 provided with the first opening 42, the traveling wind blowing part 58 provided with the second opening 56, and the intermediate part 64 provided with the straightening plates 66.

Nothing is provided on the inner wall of the traveling wind blowing part 58 on the inside in the vehicle width direction in the first embodiment, whereas in the second embodiment, a first deflection part 74, which is inclined up to the second opening 56 toward the outside in the vehicle width direction and the vehicle upper side is formed on the inner wall of the traveling wind blowing part 58 on the inside in the vehicle width direction. The first deflection part 74 is a member formed of any one of metal and resin or a combination thereof, or a member formed integrally with the side panels 34.

Working and Effects of Second Embodiment

Next, the working and the effects of the present embodiment will be described.

Similar to the vehicle side structure of a pickup truck of the first embodiment, each side panel 34 of the loading platform 16 according to the second embodiment is also configured to include the traveling wind inlet part 44 provided with the first opening 42, the traveling wind blowing part 58 provided with the second opening 56, and the intermediate part 64 provided with the straightening plates 66, the same effects as those of the first embodiment are obtained.

That is, the traveling wind, which passes through the rear end parts 72 of the cabin 14 on both sides in the vehicle width direction and tries to run around to the inside of the loading platform 16 in the vehicle width direction, is pushed out and deflected outward in the vehicle width direction due to the airstream D that has flowed out at a relatively high flow speed from the traveling wind blowing part 58 to the vehicle upper side. For this reason, the flow rate of the traveling wind that collides against the tail gate 36 erected from a vehicle rear part is further reduced, and the wind pressure that the vehicle front side of the tail gate 36 receives is further reduced.

Moreover, in the vehicle side structure of a pickup truck according to the second embodiment, by providing the first deflection part 74, the straightened airstream flows out at a relatively high flow speed toward the vehicle upper side and the outside in the vehicle width direction from the second opening 56 of the traveling wind blowing part 58. The flow rate, on the vehicle upper side of the loading platform 16, of the traveling wind that has passed through the rear end parts 72 of the cabin 14 on both sides in the vehicle width direction, that is, an aspect in which the traveling wind runs around to the inside of the loading platform 16 in the vehicle width direction on the vehicle upper side of the loading platform 16, is variously different depending on the shape of the cabin 14, and the length, width, and shape of the loading platform 16. For this reason, the running-around of the traveling wind, which has passed through the rear end parts 72 of the cabin 14 on both sides in the vehicle width direction, to the inside in the vehicle width direction is gentle. In a case where a flow on the outside in the vehicle width direction on the vehicle upper side of the traveling wind blowing part 58 is dominant, the traveling wind that flows on the vehicle upper side of the traveling wind blowing part 58 is efficiently pushed out outward in the vehicle width direction due to the airstream D that has been deflected by the first deflection part 74 and has flowed out outward in the vehicle width direction from the second opening 56 of the traveling wind blowing part 58. Accordingly, since the flow rate of the traveling wind, which runs around to the inside of the loading platform 16 in the vehicle width direction and collides against the tail gate, is further reduced, the air resistance of the overall vehicle is further reduced, and the aerodynamic performance is improved.

From the above description, in the vehicle side structure of a pickup truck according to the present embodiment, by controlling a flow rate on the rear side of the pickup truck 10 in the vehicle forward-rearward direction using the vehicle-width-direction outer part 40 of each side panel 34 of the pickup truck 10, the air resistance that the pickup truck 10 receives can be further reduced, and an increase in the weight of the vehicle can be suppressed.

Third Embodiment

Figure 7:
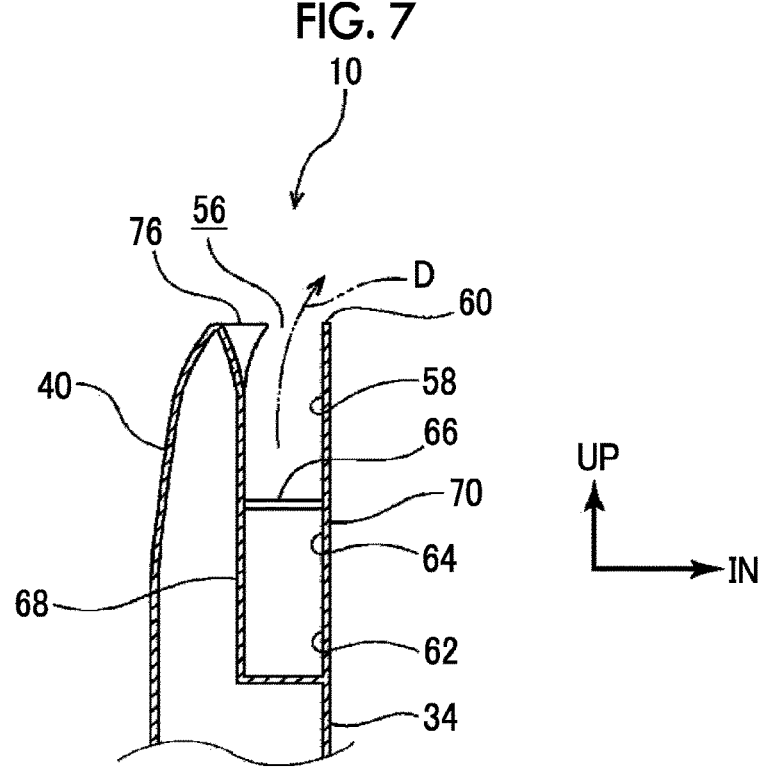
FIG. 7 is a sectional view corresponding to FIG. 5 illustrating a vehicle side structure of a pickup truck according to a third embodiment.

Next, a third embodiment of the vehicle side structure of a pickup truck will be described with reference to FIG. 7. In addition, the same components as those of the aforementioned first embodiment will be designated by the same numbers, and the description thereof will be omitted.

Similar to the vehicle side structure of a pickup truck described in the first embodiment, the vehicle side structure of a pickup truck according to the third embodiment is configured to include the cabin 14, the loading platform 16 having the side panels 34 and the tail gate 36, the traveling wind inlet part 44 provided with the first opening 42, the traveling wind blowing part 58 provided with the second opening 56, and the intermediate part 64 provided with the straightening plates 66.

Nothing is provided on the outer wall of the traveling wind blowing part 58 on the outside in the vehicle width direction in the first embodiment, whereas in the third embodiment, a second deflection part 76, which is inclined up to the second opening 56 toward the inside in the vehicle width direction and the vehicle upper side is formed on the outer wall of the traveling wind blowing part 58 on the outside in the vehicle width direction. That is, the second deflection part 76 is set on a side opposite to the first deflection part 74 of the aforementioned second embodiment in the rightward-leftward direction. The second deflection part 76 is a member formed of any one of metal and resin or a combination thereof, or a member formed integrally with the side panels 34.

Working and Effects of Third Embodiment

Next, the working and the effects of the present embodiment will be described.

Similar to the vehicle side structure of a pickup truck of the first embodiment, each side panel 34 of the loading platform 16 according to the third embodiment is also configured to include the traveling wind inlet part 44 provided with the first opening 42, the traveling wind blowing part 58 provided with the second opening 56, and the intermediate part 64 provided with the straightening plates 66, the same effects as those of the first embodiment are obtained.

That is, the traveling wind, which passes through the rear end parts 72 of the cabin 14 on both sides in the vehicle width direction and tries to run around to the inside of the loading platform 16 in the vehicle width direction, is pushed out and deflected outward in the vehicle width direction due to the airstream D that has flowed out at a relatively high flow speed from the traveling wind blowing part 58 to the vehicle upper side. For this reason, the flow rate of the traveling wind that collides against the tail gate 36 erected from a rear end part of the loading platform 16 is further reduced, and the wind pressure received by the vehicle front side of the tail gate 36 is further reduced.

Moreover, in the vehicle side structure of a pickup truck according to the third embodiment, by providing the second deflection part 76, the straightened airstream flows out at a relatively high flow speed toward the vehicle upper side and the inside in the vehicle width direction from the second opening 56 of the traveling wind blowing part 58. The flow rate, on the vehicle upper side of the loading platform 16, of the traveling wind that has passed through the rear end parts 72 of the cabin 14 on both sides in the vehicle width direction, that is, an aspect in which the traveling wind runs around the inner side of the loading platform 16 in the vehicle width direction on the vehicle upper side of the loading platform 16, is variously different depending on the shape of the cabin 14 and the length, width, and shape of the loading platform 16. For this reason, the running-around of the traveling wind, which has passed through the rear end parts 72 of the cabin 14 on both sides in the vehicle width direction, to the inside in the vehicle width direction is steep. In a case where a flow on the inside in the vehicle width direction on the vehicle upper side of the traveling wind blowing part 58 is dominant, the traveling wind that flows on the vehicle upper side of the traveling wind blowing part 58 is efficiently pushed out inward in the vehicle width direction opposite to the traveling wind blowing part 58 in the rightward-leftward direction due to the airstream D that has been deflected by the second deflection part 76 and has flowed out inward in the vehicle width direction from the second opening 56 of the traveling wind blowing part 58. Accordingly, since the flow rate of the traveling wind, which runs around to the inside of the loading platform 16 in the vehicle width direction and collides against the tail gate, is further reduced, the air resistance of the overall vehicle is further reduced, and the aerodynamic performance is improved.

From the above description, in the vehicle side structure of a pickup truck according to the present embodiment, by controlling a flow rate on the rear side of the pickup truck 10 in the vehicle forward-rearward direction using the vehicle-width-direction outer part 40 of each side panel 34 of the pickup truck 10, the air resistance received by the pickup truck 10 can be further reduced, and an increase in the weight of the vehicle can be suppressed.

Fourth Embodiment

Figure 8:
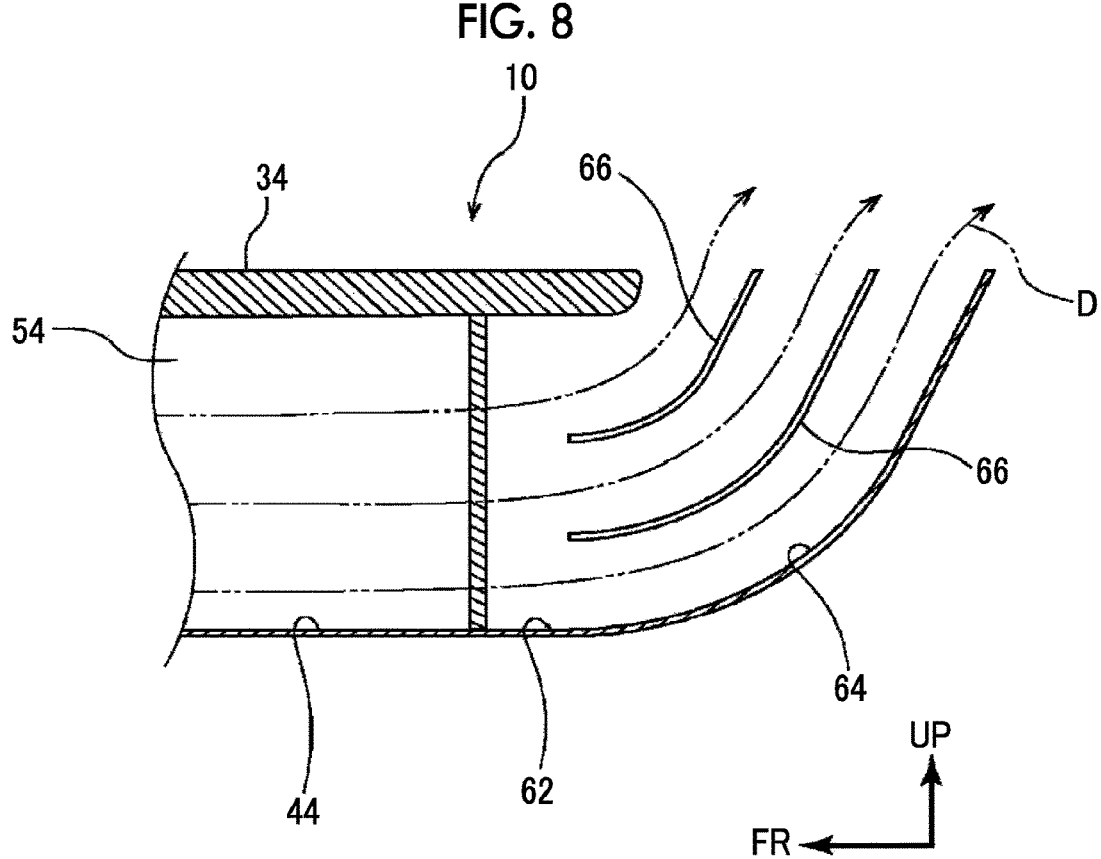
FIG. 8 is a sectional view corresponding to FIG. 4 illustrating a vehicle side structure of a pickup truck according to a fourth embodiment.

Next, a fourth embodiment of the vehicle side structure of a pickup truck will be described with reference to FIG. 8. In addition, the same components as those of the aforementioned first embodiment will be designated by the same numbers, and the description thereof will be omitted.

Similar to the vehicle side structure of a pickup truck described in the first embodiment, the vehicle side structure of a pickup truck according to the fourth embodiment is configured to include the cabin 14, the loading platform 16 having the side panels 34 and the tail gate 36, the traveling wind inlet part 44 provided with the first opening 42, the traveling wind blowing part 58 provided with the second opening 56, and the intermediate part 64 provided with the straightening plates 66.

The straightening plates 66 of the first embodiment extend parallel to the flow passage 62 and in a direction in which the traveling wind flows from the intermediate part 64 to the second opening 56, whereas in the fourth embodiment, the straightening plates 66 are deflected toward the vehicle rear side and the vehicle upper side in the traveling wind blowing part.

Working and Effects of Fourth Embodiment

Next, the working and the effects of the present embodiment will be described.

Similar to the vehicle side structure of a pickup truck of the first embodiment, each side panel 34 of the loading platform 16 according to the fourth embodiment is also configured to include the traveling wind inlet part 44 provided with the first opening 42, the traveling wind blowing part 58 provided with the second opening 56, and the intermediate part 64 provided with the straightening plates 66, and thus the same effects as those of the first embodiment are obtained.

That is, the traveling wind, which passes through the rear end parts 72 of the cabin 14 on both sides in the vehicle width direction and tries to run around to the inside of the loading platform 16 in the vehicle width direction, is pushed out and deflected outward in the vehicle width direction due to the airstream D that has flowed out at a relatively high flow speed from the traveling wind blowing part 58 to the vehicle upper side. For this reason, the flow rate of the traveling wind that collides against the tail gate 36 erected from a rear end part of the loading platform 16 is further reduced, and the wind pressure received by the vehicle front side of the tail gate 36 is further reduced.

Moreover, in the vehicle side structure of a pickup truck according to the fourth embodiment, the straightening plates 66 are deflected toward the vehicle rear side and the vehicle upper side in the traveling wind blowing part 58. For this reason, the airstream D that has been straightened by the intermediate part 64 and has flowed out of the second opening 56 of the traveling wind blowing part 58 flows at a relatively high flow speed toward the vehicle upper side and the vehicle rear. The traveling wind, which has a flow speed rearward in the vehicle forward-rearward direction and flows from the rear end parts 72 of the cabin 14 on both sides in the vehicle width direction, is accelerated toward the vehicle rear side by colliding against the airstream D. Accordingly, since the position in the vehicle forward-rearward direction where the traveling wind runs around to the inside of the loading platform 16 in the vehicle width direction is shifted toward the vehicle rear, a situation in which the traveling wind running around to the inside the loading platform 16 in the vehicle width direction collides against the tail gate 36 is avoided. For this reason, the air resistance of the overall vehicle is further reduced, and aerodynamic performance is improved.

From the above description, in the vehicle side structure of a pickup truck according to the present embodiment, by controlling a flow rate on the rear side of the pickup truck 10 in the vehicle forward-rearward direction using the vehicle-width-direction outer part 40 of each side panel 34 of the pickup truck 10, the air resistance received by the pickup truck 10 can be further reduced, and an increase in the weight of the vehicle can be suppressed.

Other Embodiments

Figure 9:
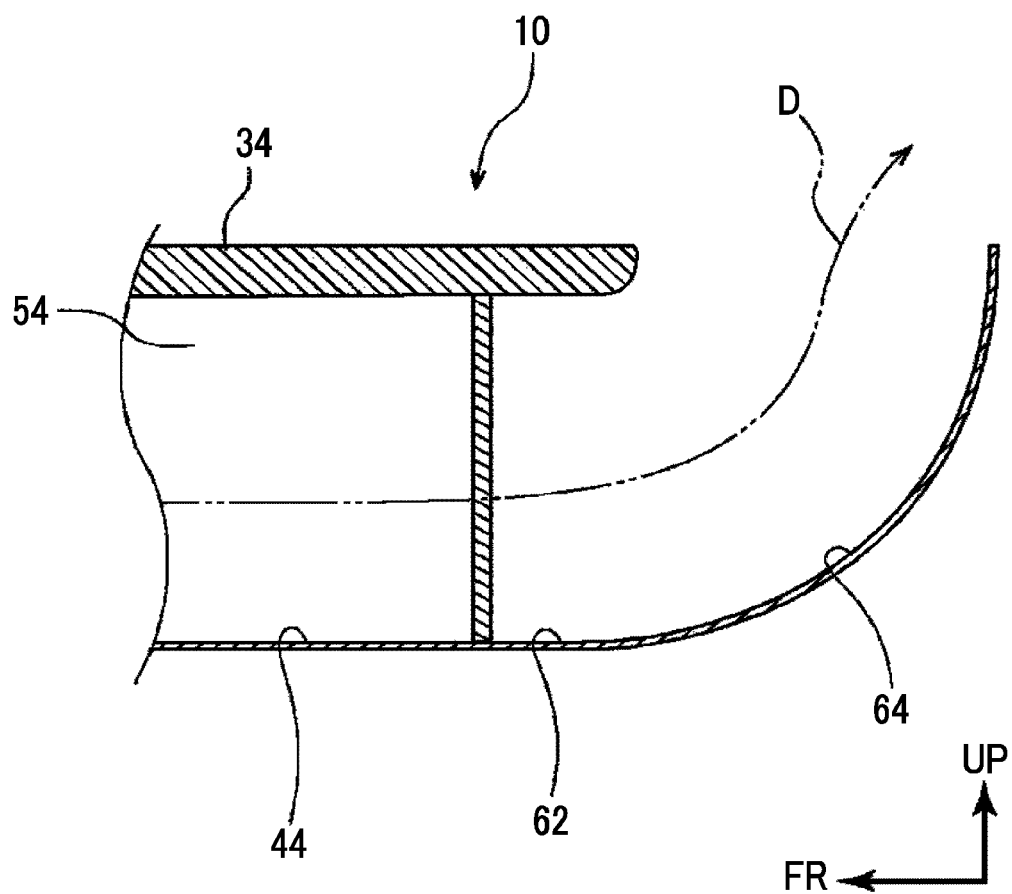
FIG. 9 is a sectional view corresponding to FIG. 4 illustrating a vehicle side structure of a pickup truck according to another embodiment.

In addition, in the present embodiment, the flow passage 62 is provided to include the straightening plates 66 extending so as to become parallel to the flow passage 62 between the intermediate part 64 and the traveling wind blowing parts 58. However, the disclosure is not limited, and as illustrated in FIG. 9, the flow passage 62 may be formed except for the straightening plates 66.

Additionally, in the present embodiment, the straightening plates 66 are provided to extend from the intermediate part 64 to the traveling wind blowing part 58. However, the disclosure is not limited to this, and the straightening plates 66 may be provided to extend from the traveling wind inlet part 44 to the traveling wind blowing part 58.

Moreover, in the present embodiment, the second opening 56 is formed such that the inner part of the second opening 56 in the vehicle width direction is formed along the ridgeline 60 that extends in the vehicle forward-rearward direction on the inside of the upper end part of each side panel 34 in the vehicle width direction in the vehicle plan view. However, the disclosure is not limited to this, and the second opening 56 may be formed at the upper end part of each side panel 34 at a position where the inner part of the second opening 56 in the vehicle width direction and the ridgeline 60 extending in the vehicle forward-rearward direction on the inside of the upper end part of the side panel 34 in the vehicle width direction do not coincide with each other in a vehicle plan view.

Moreover, in the vehicle side structure of a pickup truck illustrated in the present embodiment, as illustrated in FIG. 1 or 2, the traveling wind blowing part 58 is provided on the rear side of the upper end part of each side panel 34 in the vehicle forward-rearward direction. However, the disclosure is not limited to this, and the traveling wind blowing part 58 may be provided on the front side of the upper end part of the side panel 34 in the vehicle forward-rearward direction. This is because the aspect in which the traveling wind runs around to the inside in the vehicle width direction on the vehicle upper side of the loading platform 16 is variously different depending on the shape of the cabin 14 and the length, width, and shape of the loading platform 16.

The intermediate part may have an introduction part that is connected to the first opening and extends inward in the vehicle width direction from the first opening and in the vehicle forward-rearward direction so as to be inclined with respect to the outer part of the side panel.

The intermediate part may have a discharge part that is connected to the second opening, is disposed along an inner surface of the side panel in the vehicle width direction, and extends to the vehicle front side and a vehicle lower side from the second opening.

The flow passage may include a plurality of the straightening plates, and the straightening plates may be disposed at equal intervals between an outer wall on an outside in the vehicle width direction and an inner wall 70 on an inside in the vehicle width direction.

What is claimed is:

1. A vehicle side structure of a pickup truck, the vehicle side structure comprising:
    a cabin that is disposed at a middle of a vehicle in a vehicle forward-rearward direction; and
    a loading platform that is disposed adjacent to a rear side of the cabin in the vehicle forward-rearward direction, is configured to include a bottom plate formed in a rectangular flat plate shape, a pair of right and left side panels, the side panels being erected toward a vehicle upper side from both sides of the bottom plate in a vehicle width direction and extending in the vehicle forward-rearward direction, and a tail gate that is erected toward the vehicle upper side from a rear end part of the bottom plate and extends in the vehicle width direction, the loading platform being formed in a box shape that opens toward the vehicle upper side,
    wherein each of the right and left side panels includes
        a traveling wind inlet part that is disposed at an outer part of each of the right and left side panels in the vehicle width direction, and includes a first opening which opens toward a vehicle front side, and into which traveling wind flowing along an outer surface of each of the right and left side panels in the vehicle width direction flows,
        a traveling wind blowing part that is disposed at an upper end part of each of the right and left side panels, and includes a second opening which opens toward the vehicle upper side, and which from which the traveling wind flowing in from the traveling wind inlet part flows out, and
        an intermediate part including a flow passage provided between the traveling wind inlet part and the traveling wind blowing part.

2. The vehicle side structure according to claim 1, wherein the intermediate part has an introduction part that is connected to the first opening and extends inward in the vehicle width direction from the first opening and extends in the vehicle forward-rearward direction so as to be inclined with respect to the outer part of the side panel.

3. The vehicle side structure according to claim 1, wherein the intermediate part has a discharge part that is connected to the second opening, is disposed along an inner surface of the side panel in the vehicle width direction, and extends to the vehicle front side and a vehicle lower side from the second opening.

4. The vehicle side structure according to claim 1, wherein the flow passage includes a straightening plate that straightens the traveling wind that has flowed in from the traveling wind inlet part.

5. The vehicle side structure according to claim 4, wherein the straightening plate is provided to extend toward a vehicle rear side and the vehicle upper side in the traveling wind blowing part.

6. The vehicle side structure according to claim 4, wherein the flow passage includes a plurality of the straightening plates, and the straightening plates are disposed at equal intervals between an outer wall of the flow passage on an outside in the vehicle width direction and an inner wall of the flow passage on an inside in the vehicle width direction.

7. The vehicle side structure according to claim 1, wherein the traveling wind blowing part includes a first deflection part that is provided on an inner wall of the traveling wind blowing part on an inside in the vehicle width direction and has a first inclination surface extending up to the second opening toward an outside in the vehicle width direction and the vehicle upper side, or a second deflection part that is provided at an outer wall of the traveling wind blowing part on the outside in the vehicle width direction and has a second inclination surface extending up to the second opening toward the inside in the vehicle width direction and the vehicle upper side.

* * * * *